United States Patent [19]

Eguchi et al.

[11] Patent Number: 5,493,197
[45] Date of Patent: Feb. 20, 1996

[54] BATTERY CHARGE CONTROL CIRCUIT

[75] Inventors: Yasuhito Eguchi, Kanagawa; Kanji Murano, Tokyo; Akira Sanpei, Fukushima; Hajime Tamiya, Tokyo, all of Japan

[73] Assignees: Sony Corporation; Nippon Motorola Ltd., both of Tokyo, Japan

[21] Appl. No.: 120,905

[22] Filed: Sep. 15, 1993

[30] Foreign Application Priority Data

Sep. 17, 1992 [JP] Japan ..................... 4-274945

[51] Int. Cl.$^6$ ............ H02H 7/18; H01M 10/44; H02J 7/10
[52] U.S. Cl. .................. 320/5; 320/13; 320/30; 320/29
[58] Field of Search ................. 320/5, 13, 29, 320/15, 30, 40, 6

[56] References Cited

U.S. PATENT DOCUMENTS

| 4,086,525 | 4/1978 | Ibsen et al. ............... 320/33 |
| 4,237,385 | 12/1980 | Jurgens et al. ............ 307/66 |
| 4,595,872 | 6/1986 | Ball . | |
| 4,716,354 | 12/1987 | Hacker . | |
| 5,028,858 | 7/1991 | Schnizler et al. ........... 320/2 |
| 5,304,915 | 4/1994 | Sanpei et al. .............. 320/14 |

OTHER PUBLICATIONS

European Patent Application EP 0 525 744 A1, Feb. 3, 1993 (Eugichi et al.).
European Patent Application EP 0 512 340 A1, Nov. 11, 1992 (Sanpei et al.).
PCT Application PCT/US90/0313, Jan. 10, 1991 (Johnson).

Primary Examiner—Peter S. Wong
Assistant Examiner—Robert Nappi
Attorney, Agent, or Firm—Jay H. Maioli

[57] ABSTRACT

Circuit groups for preventing a battery from being deteriorated in efficiency due to a charging and discharging of each of secondary batteries is incorporated in a battery protection circuit for protecting a plurality of batteries connected in series to thereby extend a life of the battery. The battery protection circuit incorporates therein power down means for extending a time in which a voltage of a remaining capacity becomes 0V as much as possible by causing a current to flow only in the minimum circuit when the battery is overdischarged. Also, when a trouble such as a momentary overcurrent or the like is detected, the circuit can be prevented from set in the power down mode.

7 Claims, 5 Drawing Sheets

BATTERY CHARGE CONTROL CIRCUIT

BACKGROUND OF THE INVENTION

1. Field of the Invention

The present invention relates to a so-called battery protection circuit for protecting a secondary battery from overcharge and overdischarge.

2. Description of the Related Art

When a battery is brought in the overdischarge state, a battery performance thereof is deteriorated considerably. For this reason, a protection circuit is provided to prevent the battery from being deteriorated. In a battery pack in which a plurality of batteries are connected in series, batteries can be protected from the overcharge and the overdischarge by turning on and/or off a battery charger detecting the overcharge and the overdischarge and the load side of the batteries on the basis of a total voltage of the batteries connected in series.

A battery protection function is not provided on the battery side but is provided on the battery charger and the load side thereof. Also, the battery protection circuit additionally includes a circuit for turning on and/or off the power supply by detecting a temperature by a thermostat or the like incorporated within the battery or battery pack when an abnormal overcharge or overcurrent is caused in the charger or load side.

Further, as other battery protection circuit, there is known opened Japanese patent (laid-open patent publication No. 4-75430, laid-open on Mar. 10, 1992) proposed by ASAHI CHEMICAL INDUSTRY CO., LTD.

This previously-proposed battery protection circuit is such one that a rechargeable power apparatus having a rapid chargeable secondary battery includes an overdischarge preventing mechanism and an overcharge preventing function by constructing a discharging circuit and a charging circuit by using a device including therein a parasitic diode.

That is, upon discharging, when the voltage across the battery becomes less than a constant voltage, a MOS FET (metal oxide semiconductor field effect transistor) is changed from the conductive state to the interrupted state by the output voltage of the control means to thereby interrupt the battery discharging circuit. When the voltage across the battery is restored by the charging through the parasitic diode of the MOS FET, the battery is charged in a normal fashion (with low loss). Similarly, upon charging, when the voltage across the battery becomes higher than a certain voltage, the MOS FET is changed from the conductive state to the interrupted state by the output from the control means to thereby interrupt the battery charging circuit. When the voltage across the battery is recovered by the discharge through the parasitic diodes of the MOS FET, the normal discharge (with low loss) is carried out.

However, according to the above-mentioned method, when characteristics of batteries in the battery formed of a plurality of batteries are not equal, there is then the risk that only particular battery is overcharged or overdischarged. Particularly, in a battery whose efficiency is considerably deteriorated by the overdischarging and overcharging, the usable battery capacity is reduced or such battery cannot be utilized substantially.

To solve this problem, the assignee of the present application has previously proposed a method (Japanese patent application No. 3-213019 filed on Jul. 31, 1991 and now Japanese laid-open patent publication No. 5-49181, laid-open on Feb. 26, 1993).

According to this previously-proposed method, in the process in which secondary batteries connected in series are repeatedly charged and discharged, even when a battery capacity balance is lost by a difference of individual batteries, a charging and discharging circuit includes a battery capacity balance circuit having a function to recover such balance to thereby prevent the battery from being overcharged and overdischarged.

More specifically, the battery capacity balance circuit is fundamentally formed of a circuit for protecting the battery. In other words, this battery capacity balance circuit is comprised of circuit groups for detecting the overcharge, turning off the charging current, detecting the overflow, detecting the overdischarge, turning off the discharge current, and detecting the hysteresis and the overcurrent to protect the battery.

According to the conventional technique and the previously-proposed technique, even when the overdischarged state or overcharged state of the battery is detected, a current, for example, is flowed to the circuit groups after the overdischarging was detected. Hence, a consuming current is constantly flowed. Consequently, the battery remaining capacity maintaining period is reduced. For example, if the remaining capacity is 30 mAh and a circuit current is 20 $\mu$A, then the battery remaining capacity amount is used up in 1500 hours (about two months).

OBJECTS AND SUMMARY OF THE INVENTION

Therefore, it is an object of the present invention to provide an improved battery protection circuit in which the aforesaid shortcomings and disadvantages encountered with the prior art can be eliminated.

More specifically, it is an object of the present invention to provide a battery protection circuit in which a current flowing to the circuit groups for detecting the overdischarging and overcharging of the battery and a current flowing to the circuit after the overdischarging is detected can be reduced as much as possible to thereby suppress the discharge as much as possible to protect the battery.

Another object of the present invention is to provide a battery protection circuit in which the battery can be recovered to the charging state with ease reliably from the state that a current consumed by the circuit when the overdischarging is carried out is reduced considerably.

Still another object of the present invention is to provide a battery protection circuit in which a battery can be returned to the ordinary state even when a voltage of a secondary battery is substantially 0 V under the condition that a current consumed by the circuit when the overdischarging is carried out is reduced considerably.

A further object of the present invention is to provide a battery protection circuit in which, when any one of a plurality of secondary batteries is in the overcharged state, a balance between the overcharged battery and an overdischarged battery can be balanced readily.

A further object of the present invention is to provide a battery protection circuit in which a battery voltage can be stably supplied regardless of a temporarily external fluctuation.

Yet a further object of the present invention is to provide a battery protection circuit which can prevent a trouble from occurring upon charging and discharging.

Yet a further object of the present invention is to provide a battery protection circuit which can prevent a malfunction when the overdischarge and overcharge are detected.

Yet a further object of the present invention is to provide a battery protection circuit in which a battery can be charged readily when the battery is charged again from the overdischarged state.

Still a further object of the present invention is to provide a battery protection circuit in which a matching of all of a plurality of secondary batteries can be obtained in a battery protection circuit in which a plurality of secondary batteries are connected in series.

Still a further object of the present invention is to provide a battery protection circuit in which, when a large current is momentarily flowed, a detection of a voltage drop of a battery is delayed to avoid a malfunction of a circuit.

According to an aspect of the present invention, there is provided a battery protection circuit which comprises a secondary battery, state detecting means for detecting a voltage of the secondary battery and detecting an overdischarged or overcharged state of the secondary battery by comparing the detected voltage with a reference voltage, first switching means for interrupting a discharging current, second switching means for interrupting a charging current, control means for controlling the switching of the first and second switching means on the basis of a detected result of the state detecting means, power down switching means for interrupting a voltage and a reference voltage supplied to the state detecting means, power down means for making the power down switching means nonconductive when the overcharged state of the secondary battery is detected by the state detecting means, power down releasing means for returning the power down switching means from nonconductive state to a conductive state when a charging of the secondary battery is started again from the overdischarged state, and state holding means for detecting that the secondary battery is started to be charged again from the overdischarged state by detecting a charging voltage produced across terminals of the secondary battery and holding the detected charging state.

According to another aspect of the present invention, there is provided a battery protection circuit wherein the state holding means holds the charging state until a voltage of the secondary battery gets away from an overdischarging region.

According to still another aspect of the present invention, there is provided a battery protection circuit wherein the power down means makes the power down switching means nonconductive when an overdischarged state of at least one secondary battery is detected by the state detecting means in a battery protection circuit in which a plurality of secondary batteries are connected in series.

According to a further aspect of the present invention, there is provided a battery protection circuit wherein the power down releasing means makes a reference voltage power down switching means in the state detecting means conductive first and makes other power down switching means conductive after the occurrence of a reference voltage is detected.

According to a further aspect of the present invention, there is provided a battery protection circuit which further comprises means for forcing the secondary battery to set in the state so that the secondary battery can be charged when the power down switching means is nonconductive and a voltage of the secondary battery is substantially 0V.

According to yet a further object of the present invention, there is provided a battery protection circuit which further comprises power down inhibiting means for holding the power down switching means in conductive state when any of the secondary batteries is in the overcharged state.

In accordance with still a further object of the present invention, there is provided a battery protection circuit which further comprises overcurrent detecting means for detecting a large current when the large current is flowed momentarily, in which the power down inhibiting means hold the power down switching means in the conductive state on the basis of a detection signal from the overcurrent detecting means.

According to the battery protection circuit of the present invention, since the overcharge state and the overdischarged state are detected by monitoring a voltage from each of batteries constructing a battery pack and a switch, a load, a battery charger on the battery pack side are turned on and/or off, an influence exerted by abnormality of the battery charger or the load can be suppressed to the minimum. Also, the batteries forming the battery pack can be balanced in response to the overcharged state or overdischarge state. Further, a current consumed by the circuit group used in detecting and controlling the voltage is set in the power down mode in the overdischarging region to thereby reduce a consumed current.

BRIEF DESCRIPTION OF THE DRAWINGS

A better understanding of other objects, features, and advantages of the present invention can be gained from a consideration of the following detailed description of an illustrative embodiment thereof, in conjunction with the figures of the accompanying drawings, in which.

DETAILED DESCRIPTION OF THE PREFERRED EMBODIMENT

A battery protection circuit according to the present invention will now be described in detail with reference to the drawings.

Figure 1:
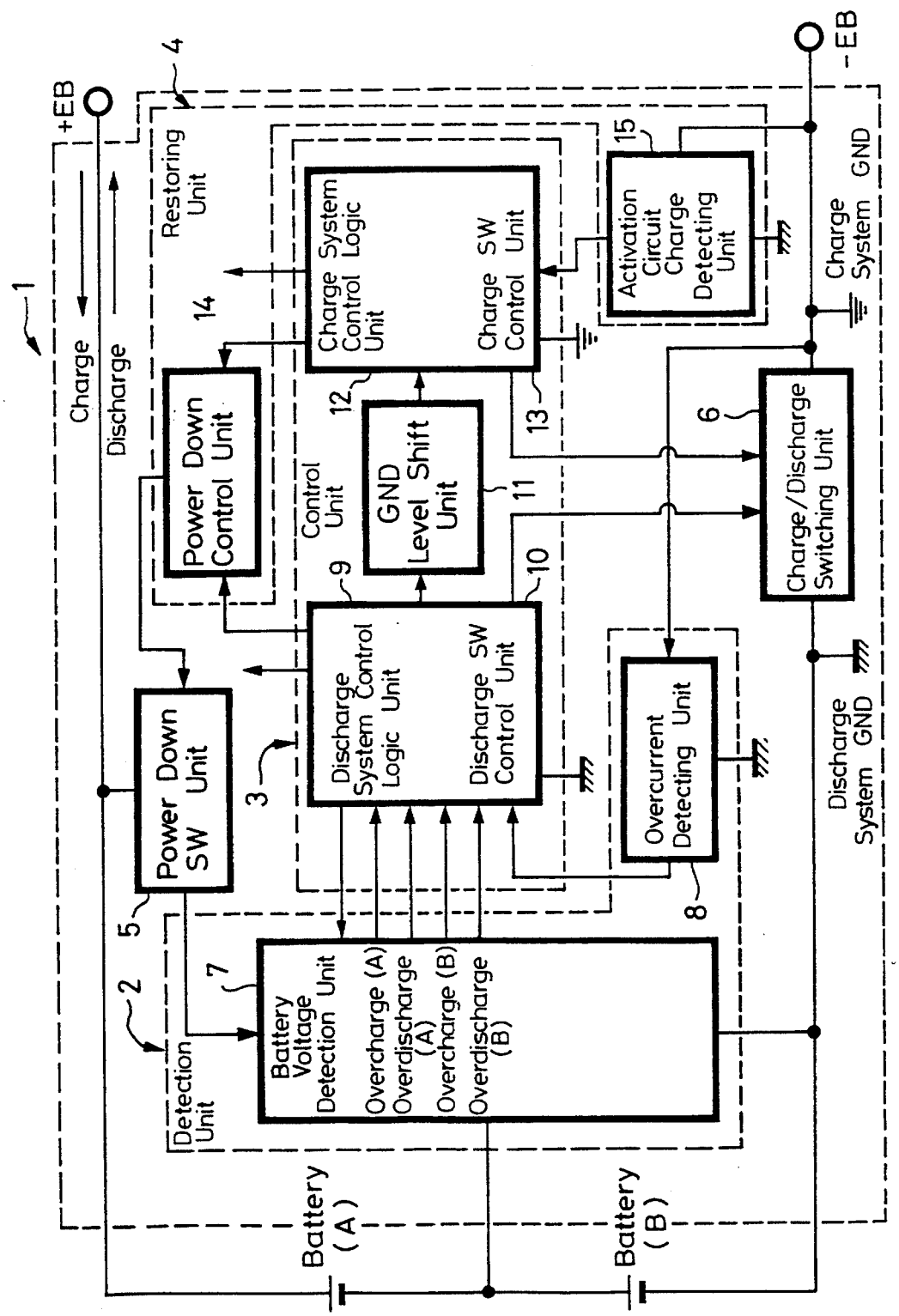
FIG. 1 is a block diagram showing an overall circuit arrangement of a battery protection circuit according to an embodiment of the present invention.

FIG. 1 of the accompanying drawings schematically shows in block form a battery protection circuit according to a first embodiment of the present invention.

A battery protection circuit that is generally depicted by reference numeral 1 in FIG. 1 comprises a detecting unit 2, a control unit 3, a restoring unit 4, a power down switching (SW) unit 5 and a charge and discharge switching unit 6. The battery protection circuit 1 is adapted to control the charge and discharge of batteries Abat and Bbat which are a plurality of batteries.

The detecting unit 2 is comprised of a battery voltage detecting unit 7 and an overcurrent detecting unit 8. The battery voltage detecting unit 7 is adapted to detect the overcharge state (A, B) and the overdischarge state (A, B)

from respective voltages of the batteries Abat and Bbat. The overcurrent detecting unit 8 is adapted to detect the overcurrent state.

The control unit 3 is comprised of a discharge system control logic unit 9, a discharge switching (Sw) control unit 10, a ground (GND) level shift unit 11, a charge system control logic unit 12 and a charge SW control unit 13.

The discharge-system control logic unit 9 and the discharge SW control unit 10 of the control unit 3 are adapted to output an overflow current signal to the battery voltage detecting unit 7, the discharge switch signal to the charge and discharge switching unit 6 which will be described later on and a power down signal to the restoring unit 4 on the basis of the charge and discharge states of the batteries Abat and Bbat detected by the battery voltage detecting unit 7 of the detecting unit 2 and the overcurrent signal state detected by the overcurrent detecting unit 8.

A ground signal from the discharge system control logic unit 9 and the discharge SW control unit 10 is input through the GND level shift unit 11 to the charge system control logic unit 12 and the charge SW control unit 13.

The GND level shift unit 11 of the control unit 3 is adapted to determine ground potentials to be constant because grounds of the discharge switches of the discharge system control logic unit 9 and the discharge SW control unit 10 and charge switches of the charge system control logic unit 12 and the charge SW control unit 13 are different.

The charging system control logic unit 12 and the charging SW control unit 13 of the control unit 3 control the charging and discharging switching unit 6 and output a power down releasing signal to the restoring unit 4 on the basis of the battery condition and a charging detection (activating circuit) or the like.

The restoring circuit 4 is comprised of a power down control unit 14 and an activating circuit charging detecting unit 15. The power down control unit 14 supplies a power down signal from the discharging system control logic unit 9 to the power down SW unit 5 which will be described later on and also supplies the power down releasing signal from the charging system control logic unit 12 to the power down SW unit 5. Further, the activation circuit charging detecting unit 15 automatically starts the charging of the secondary battery.

The power down SW unit 5 supplies the power down signal from the power down control unit 14 to the detecting unit 2 and the control unit 3 and turns off the power supply to set the battery protecting circuit in the power down mode.

The charging and discharging switch 6 charges and discharges batteries Abat and Bbat under the control of the discharging SW control unit 10 and the charging SW control unit 13 of the control unit 3.

Operation in the discharging mode and the charging mode will be described with reference to a block diagram of FIG. 1.

(1) Discharging mode:

In the battery formed of a plurality of batteries Abat and Bbat, the battery voltage detecting unit 7 of the detecting unit 2 constantly monitors the discharging state of the batteries Abat and Bbat. When any one of the batteries Abat and Bbat is set in the discharged state, an overdischarge signal A or overdischarge signal B is supplied to the discharging system control logic unit 9 of the control unit 3 so that, under the control of the discharging system control unit 9, the discharging switch of the charging and discharging switching unit 6 is turned off by the discharging SW control unit 10.

The discharging switch 6 in the charging and discharging switching unit 6 is turned off and also the battery protection circuit is placed in the power down mode. The battery protection circuit is placed in the power down mode when any one of the batteries Abat and Bbat is set in the overdischarged state, i.e., when any one of the batteries Abat and Bbat in the battery formed of the batteries Abat and Bbat is set in the overdischarged state.

Upon discharging, when the overcurrent detecting unit 8 of the detecting unit 2 detects that an overcurrent having a predetermined value is flowed during a predetermined period of time, the discharging switch of the charging and discharging switching unit 6 is turned off by the discharging SW control unit 10 of the control unit 3. Incidentally, if an overcurrent state presented by a momentary large current falls within a predetermined period of time, the discharging switch is not turned off. Further, if the overdischarging state presented by the large current falls within a predetermined time, the battery protection circuit can be prevented from being placed in the power down mode.

(2) Charging mode:

In the battery formed of the battery Abat or Bbat, when the battery voltage detecting unit 7 of the detecting unit 2 detects that the battery Abat or Bbat is set in the overcharged state, the overcharge signal A or B is supplied to the charging system control logic unit 12 of the control unit 3 and the charging switch of the charging and discharging switching unit 6 is turned off. Simultaneously, the battery that had been overcharged is discharged by an overflow circuit, though not shown.

When the battery is charged from the power down mode, the charging operation is forcibly carried out on the basis of the charging detecting signal from the activation circuit charging detecting unit 15 of the restoring unit 4 under the control of the charging SW control unit 13 of the control unit 3 and also, a power down mode releasing preparation is carried out. Then, a total battery voltage is increased in excess of a predetermined voltage value (reference voltage is generated), whereby the detecting unit 2 is forced in the power down releasing mode to detect the battery voltage. When the batteries Abat and Bbat are both escaped from the overdischarged stage, the power down release signal is supplied to the power down control unit 14 of the restoring unit 4 and the battery protection circuit is released from the power down mode. That is to say, the battery is escaped from the overdischarged state and set in the normal charged state. Incidentally, if one of the batteries Abat and Bbat is set in the overcharged state while the other is set in the overdischarged state, the battery protection circuit is not set in the power down mode and the overcharged state is given a highest priority.

Figure 2:
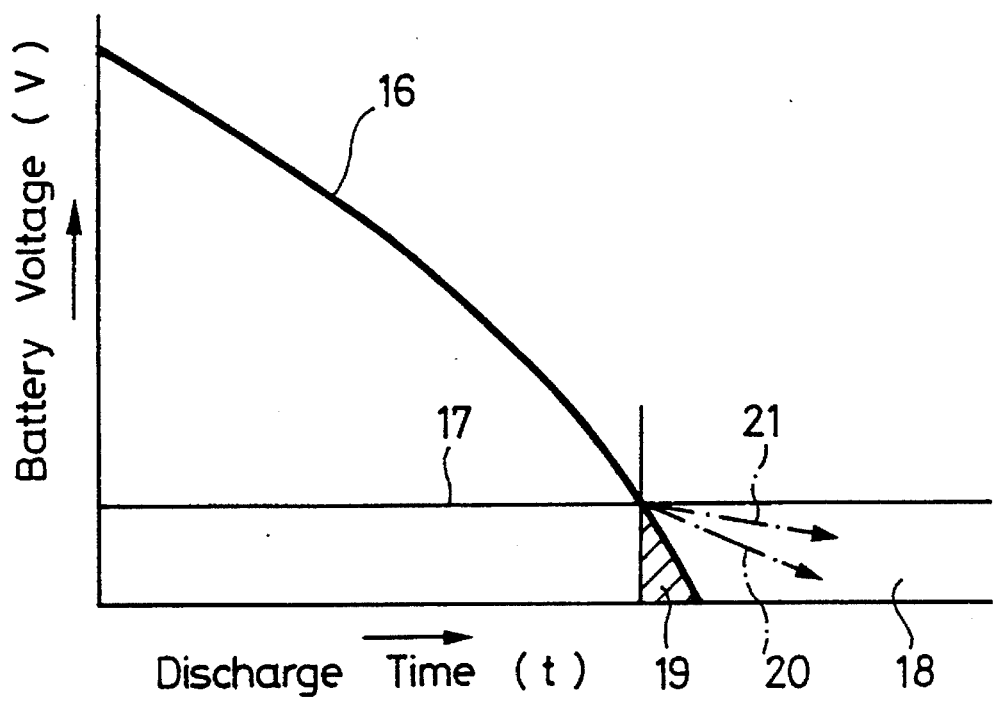
FIG. 2 is a graph used to explain a battery discharge characteristic.

A discharging characteristic of battery formed of batteries Abat and Bbat and the power down mode will be described. In the discharging characteristic of the battery, as shown in FIG. 2, the battery voltage is continuously lowered with a discharging time while drawing a discharge curve 16, and the condition that the battery voltage becomes less than an overdischarge voltage 17 that is set to a predetermined voltage value in advance is the overdischarged state.

If the detecting unit 2 shown in FIG. 1 detects the overdischarged state, then the discharge for the load is stopped by turning off the discharging switch of the charging and discharging switching unit 6. Then, battery voltage is held in an overdischarge region 18 and a remaining capacity (mAh) 19 thereof shown hatched can be calculated beforehand.

However, even after the discharge for the load was stopped, a small current is continuously flowed to the battery protection circuit 1 shown in FIG. 1. Accordingly, since the discharge is continued, the discharging curve in the remaining capacity 19 becomes a discharging direction curve 20.

For this reason, the power down mode is proposed, which is a method of interrupting the supply of a current to circuits except necessary minimum circuits of the battery protection circuit that was set in the overdischarged state.

Because the power down mode is provided, the discharging curve becomes a discharging direction curve 21 so that a voltage maintaining period provided by the remaining capacity 19 when the battery protection circuit 1 is set in the overdischarged state becomes very different as compared with the voltage maintaining period in which the power down mode is not provided. Assuming now that the remaining capacity 19 provided when the battery protection circuit 1 is set in the overdischarged state is 30 mAh, a circuit consumption current required by the battery protection circuit 1 to operate in the overdischarging region 18 is 20 µa and that a circuit consumption current required by the battery protection circuit 1 to operate in the overdischarge region 18 when the power down mode is provided is 1 µA, then a time period in which the battery voltage is set to 0 V from the overdischarge region 18 can be improved considerably as shown on the table 1 below.

TABLE 1

|  | Operation mode | Power down mode |
|---|---|---|
| Circuit consumed current | 20 µA | 1 µA |
| Battery Remaining time | about 1,500 hours about 2 months | about 30,000 hours about 3.5 years |

Study of the table 1 reveals that a time period in which the battery voltage becomes 0 V can be improved considerably as 1500 hours→30,000 hours. In actual practice, when the battery voltage is lowered, a consumption current is reduced to some extent and a battery voltage can be maintained for a long period of time. Hence, the battery efficiency can be prevented from being deteriorated even when the battery is overdischarged.

The battery protection circuit according to an embodiment of the present invention will be described with reference to the drawings.

Figure 3A:
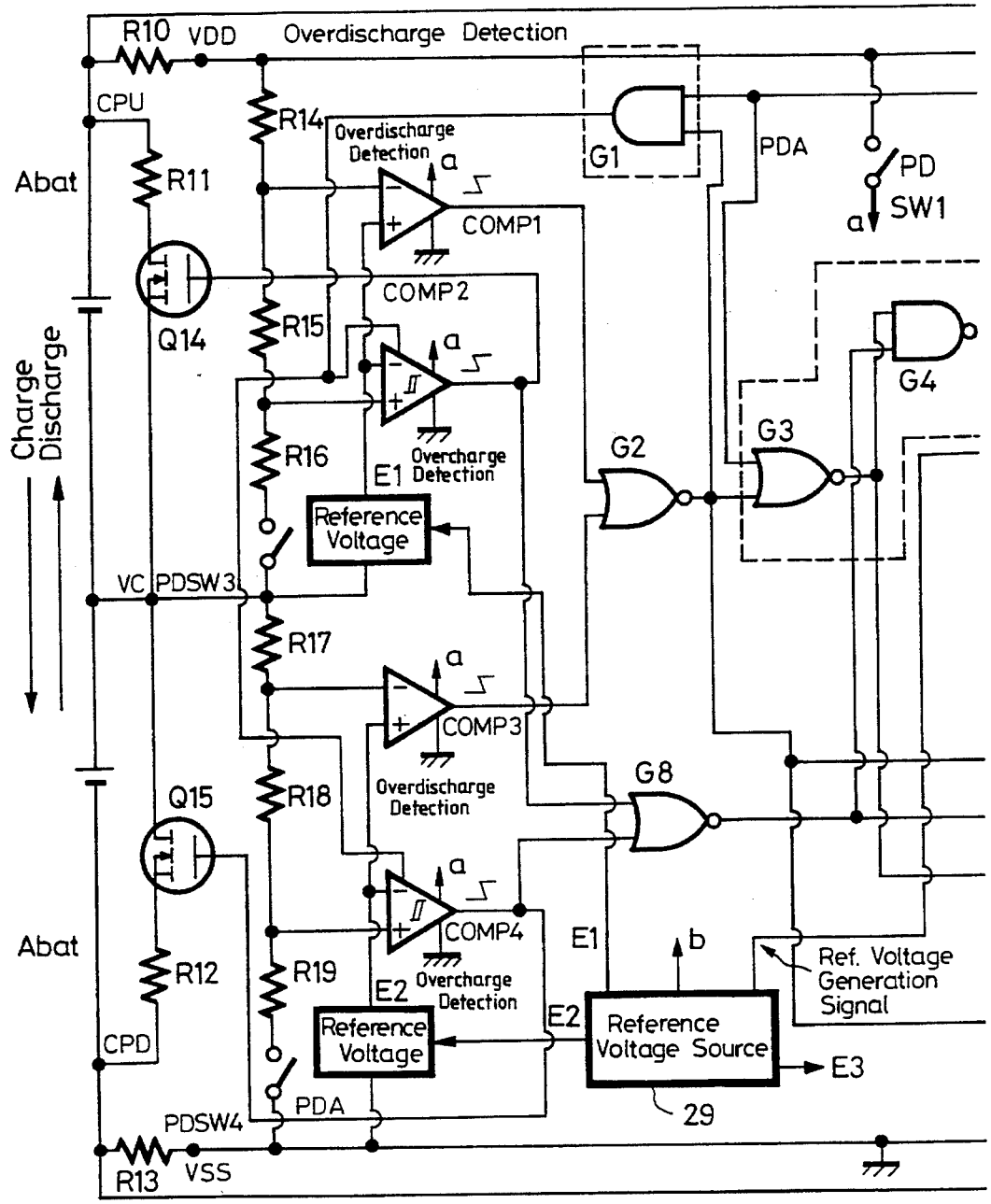
FIG. 3 (formed of FIGS. 3A, 3B) is a block diagram showing a practical embodiment of a battery protection circuit according to the present invention.
Figure 3B:
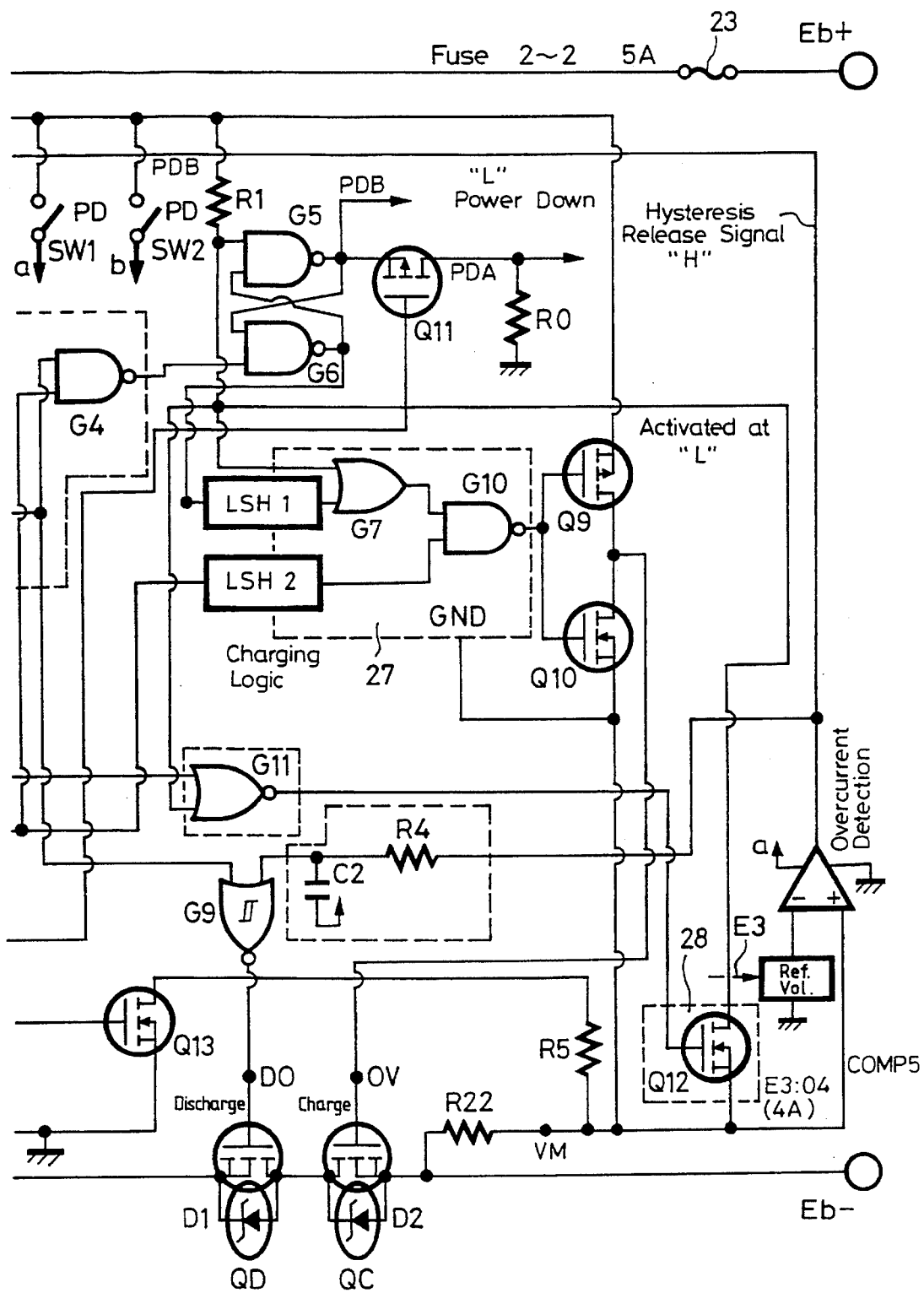

FIG. 3 (formed of FIGS. 3A, 3B drawn on two sheets of drawings so as to permit a suitably large scale) is a block diagram showing a circuit arrangement of the battery protection circuit 1. The battery protection circuit 1 is mainly comprised of five comparators, a plurality of switching elements and a plurality of gates that are connected as described below.

A battery assembly in which the battery protection circuit 1 is incorporated is connected to a plus side of the battery Abat through a fuse 23 connected to a plus side connection terminal (Eb+) that is connected to the plus side of a battery charger or the load. The minus side of the battery Abat is connected to the plus side of the battery Bbat, presenting a so-called series connection.

The minus side of the battery Bbat is connected through a discharging power NMOS transistor QD and a charging power NMOS transistor QC to the minus side terminal (Eb−) that is the connection terminal of the minus-side of the battery charger or the load.

The battery protection circuit 1 is connected through the plus-side terminal (Eb+) and a protection resistor R10 to a terminal VDD. A terminal CPU is connected through a resistor R11 to a drain terminal of an NMOS transistor Q14.

A junction between the minus-side of the battery Abat and the plus-side of the battery Bbat is connected to a terminal VC. A minus-side terminal CPD of the battery Bbat is connected through a resistor 12 to a drain terminal of an NMOS transistor Q15 and also connected through a protection resistor R13 to a terminal VSS.

The power N-channel MOS transistor QD (hereinafter referred to as a power NMOS transistor QD) is a transistor which includes a source terminal, a gate terminal, a drain terminal and a parasitic diode D1. The source terminal thereof is connected to the minus-side of the battery Bbat, the gate terminal thereof is connected to a terminal DO, and the drain terminal thereof is connected to the drain terminal of the power NMOS transistor QC.

The power N-channel MOS transistor QC (hereinafter referred to as a power NMOS transistor QC) is a transistor which includes a source terminal, a gate terminal, a drain terminal and a parasitic diode D2. The source terminal thereof is connected to the minus-side terminal (Eb−), the gate terminal thereof is connected to a terminal OV and the drain terminal thereof is connected to the drain terminal of the power NMOS transistor QD. The minus-side terminal (Eb−) is connected to a terminal VM through a protection resistor R22.

Power down switches PDSW1 to PDSW4 are closed and opened by power down signals PDA, PDB. One terminals of the power down switches PDSW1, PDSW2 are connected to the terminal VDD. A junction a of the power down switch PDSW1 and a junction b of the power down switch PDSW2 which are other terminals are connected to power supply terminals of comparators COMP1, COMP2, COMP3, COMP4, COMP5 and a power supply terminal of a reference voltage source 29, respectively.

One terminal of the power down switch PDSW3 is connected to the other end of a resistor R16 and the other terminal thereof is connected to the terminal VC.

One terminal of the power down switch PDSW4 is connected to the other end of the resistor R19 and the other terminal thereof is connected to the terminal VSS.

The comparator COMP1 comprises two input terminals and one output terminal. One inverting input terminal (hereinafter referred to as minus-side input terminal) thereof is connected to a junction between the other end of a resistor R14 and one end of a resistor R15 and the other non-inverting input terminal (hereinafter referred to as a plus-side input terminal) thereof is connected to the plus-side of a reference voltage E1 (+1.5 V). The output terminal thereof is connected to one input terminal of a NOR gate G2. Incidentally, one end of the resistor R14 is connected to the terminal VDD and the other end of the resistor R15 is connected to a junction between one end of the resistor R11 and the plus-side input terminal of the comparator COMP2. The minus side of the reference voltage E1 is connected to the terminal VC.

The comparator COMP2 comprises two input terminals and one output terminal. One minus-side input terminal thereof is connected to the plus side of the reference voltage E1 (+1.5 V) and the other plus-side input terminal thereof is connected to a junction between the other end of the resistor R15 and one end of the resistor R16. The output terminal thereof is connected to one input terminal of a NOR gate G8 and the gate terminal of the NMOS transistor Q14. A hysteresis switch input terminal of the comparator COMP2 is connected to the output terminal of an AND gate G1.

The comparator COMP3 comprises two input terminals and one output terminal. One minus-side input terminal thereof is connected to a junction between the other end of a resistor R17 and one end of a resistor R18. The other plus-side input terminal thereof is connected to a plus-side of a reference voltage E2 (+1.5 V). The output terminal thereof is connected to the other input terminal of the NOR gate G2. One end of the resistor R17 is connected to the terminal VC and the other end of the resistor R18 is connected to one end of the resistor R19 and the plus-side input terminal of the comparator COMP4.

The comparator COMP4 comprises two input terminals and one output terminal. One minus-side input terminal thereof is connected to a plus side of the reference voltage E2 (+1.5 V) and the other plus-side input terminal thereof is connected to a junction between the other end of the resistor R18 and one end of the resistor R19. The output terminal thereof is connected to the other input terminal of the NOR gate G8 and the gate terminal of the NMOS transistor Q15. A hysteresis switch input terminal of the comparator COMP4 is connected to the output terminal of the AND gate G1.

A comparator COMP5 comprises two input terminals and one output terminal. One minus-side input terminal thereof is connected to the plus side of a reference voltage E3 (+0.4 V) and the other plus-side input terminal thereof is connected to the terminal VM. The output terminal thereof is connected to the other end of a resistor R4 that constructs a delay CR and one input terminal of the AND gate G1. One end of the resistor R4 is connected to one input terminal of a NOR gate G9 and one end of a capacitor C2. The other end of the capacitor C2 is connected to the terminal VDD.

The AND gate G1 includes two input terminals and one output terminal. One input terminal thereof is connected to the output terminal of the comparator COMP5, and the other input terminal thereof is connected to the output terminal of the NOR gate G2. The output terminal of the AND gate G1 is connected to the hysteresis switch input terminals of the comparators COMP2, COMP4.

The NOR gate G2 includes two input terminals and one output terminal. One input terminal thereof is connected to the output terminal of the comparator COMP1, and the other input terminal thereof is connected to the output terminal of the comparator COMP3. The output terminal of the AND gate G2 is connected to the other input terminal of the AND gate 1, one input terminal of the NOR gate G3, one input terminal of a NOR gate G11 and the gate terminal of an NMOS transistor Q13.

The NOR gate G3 includes two input terminals and one output terminal. One input terminal thereof is connected to the output terminal of the NOR gate G2, and the other input terminal thereof is connected to the output terminal of the comparator COMP5. The output terminal of the AND gate G3 is connected to one input terminal of a NAND gate G4 and the other input terminal of the NOR gate G9.

The NAND gate G4 includes two input terminals and one output terminal. One input terminal thereof is connected to the output terminal of the NOR gate G3, and the other input terminal of the NAND gate G4 is connected to the output terminal of the NOR gate G8. The output terminal of the NAND gate G4 is connected to one input terminal of a NAND gate G6 of a power down latch circuit.

A NAND gate G5 includes two input terminals and one output terminal and forms the power down latch circuit together with the NAND gate G6. One input terminal of the NAND gate G5 is connected to the other end of a resistor R1, and the other input terminal thereof is connected to the output terminal of the NAND gate G6. The output terminal of the NAND gate G5 is connected to the source terminal of an NMOS transistor Q11. A power down signal PDB is generated from this output terminal of the NAND gate G5.

The NAND gate G6 includes two input terminals and one output terminal, and forms the power down latch circuit together with the NAND gate G5. One input terminal of the NAND gate G6 is connected to the output terminal of the NAND gate G5 and the other input terminal of the NAND gate G6 is connected to the output terminal of the NAND gate G4. The output terminal of the NAND gate G6 is connected to the input terminal of the NAND gate G5, an input section of a GND level shift unit LSH1 of a charging logic, and one input terminal of a NOR gate G11.

An OR gate G7 includes two input terminals and one output terminal and is one element of the charging logic. One input terminal of the NAND gate G6 is connected through the resistor R1 to the terminal VDD and the other input terminal is connected to an output section of the GND level shift unit LSH1. The output terminal thereof is connected to one input terminal of a NAND gate G10.

The NOR gate G8 includes two input terminals and one output terminal. One input terminal thereof is connected to the output terminal of the comparator COMP2, and the other input terminal thereof is connected to the output terminal of the comparator COMP4. The output terminal thereof is connected to the input terminal of the NAND gate G4, and an input section of a GND level shift unit LSH2 which constructs the charging logic.

The NOR gate G9 includes two input terminals and one output terminal. One input terminal thereof is connected to the output terminal of the NOR gate G3, and the other input terminal thereof is connected to one end of the resistor R4 and one end of the capacitor C2. The output terminal thereof is connected through the terminal DO to the gate terminal of the power NMOS transistor QD.

The NAND gate G10 includes two input terminals and one output terminal. One input terminal thereof is connected to the output terminal of the OR gate G7, and the other input terminal thereof is connected to the output section of the GND level shift unit LSH2. The output terminal thereof is connected to the gate terminals of PMOS transistors Q9, Q10.

The NOR gate G11 includes two input terminals and one output terminal. One input terminal thereof is connected to the output terminal of the NOR gate G2, and the other input terminal thereof is connected to the output terminal of an NMOS transistor Q12. The output terminal thereof is connected to the gate terminal of the NMOS transistor Q12.

The P-channel MOS transistor Q9 (hereinafter referred to as a PMOS transistor Q9) includes a source terminal, a gate terminal and a drain terminal. The source terminal thereof is connected to the terminal VDD, the gate terminal thereof is connected to the output terminal of the NAND gate G10, and the drain terminal thereof is connected to the drain terminal of the NMOS transistor Q10 and to the gate terminal of the power NMOS transistor QC through the terminal OV.

The N-channel MOS transistor Q10 (hereinafter referred to as an NMOS transistor Q10) includes a source terminal, a gate terminal and a drain terminal. The source terminal thereof is connected to the terminal VM and the GND of the charging logic, and the gate terminal thereof is connected to the output terminal of the NAND gate G10. The drain terminal thereof is connected to the drain terminal of the PMOS transistor Q9 and to the gate terminal of the power NMOS transistor QC through the terminal OV.

The P-channel MOS transistor Q11 (hereinafter referred to as a PMOS transistor Q11) includes a source terminal, a gate terminal and a drain terminal. The source terminal thereof is connected to the output terminal of the NAND gate G5, the gate terminal thereof is connected to the reference voltage source 29 at its terminal from which a reference voltage generation signal is generated and the drain terminal thereof is connected to one end of the resistor R0. The power down signal (PDA) is generated from this drain terminal. Incidentally, the other end of the resistor R0 is grounded.

The N-channel MOS transistor Q12 (hereinafter referred to as an NMOS transistor Q12) includes a source terminal, a gate terminal and a drain terminal. The source terminal thereof is connected to the terminal VM, the gate terminal thereof is connected to the output terminal of the NOR gate G11, and the drain terminal thereof is connected to the input terminals of the NAND gates G5, G7 and the other end of the resistor R1.

The N-channel MOS transistor Q13 (hereinafter referred to as an NMOS transistor Q13) includes a source terminal, a gate terminal, and a drain terminal. The source terminal thereof is connected to the terminal VSS, the gate terminal thereof is connected to the output terminal of the NOR gate G2, and the drain terminal thereof is connected to one end of a resistor R5. Incidentally, the other end of the resistor R5 is connected to the terminal VM.

The N-channel MOS transistor Q14 (hereinafter referred to as an NMOS transistor Q14) includes a source terminal, a gate terminal and a drain terminal. The source terminal thereof is connected to the terminal VC, the gate terminal thereof is connected to the output terminal of the comparator COMP2, and the drain terminal thereof is connected through the resistor R11 to the terminal CPU.

The N-channel MOS transistor Q15 (hereinafter referred to as an NMOS transistor Q15) includes a source terminal, a gate terminal and a drain terminal. The source terminal thereof is connected to the terminal VC, the gate terminal thereof is connected to the output terminal of the comparator COMP4, and the drain terminal thereof is connected through the resistor R12 to the terminal CPD.

The input section of the GND level shift unit LSH1 is connected to the output terminal of the NAND gate G6 of the power down latch circuit and the output section thereof is connected to the input terminal of the OR gate G7.

The input section of the GND level shift unit LSH2 is connected to the output terminal of the NOR gate G8, and the output section thereof is connected to the input terminal of the NAND gate G10.

The reference voltage source 29 generates reference voltage values E1, E2 and E3. The reference voltage value E1 is supplied to the plus-side input terminal of the comparator COMP1 and the minus-side input terminal of the comparator COMP2. The reference voltage value E2 is supplied to the plus-side input terminal of the comparator COMP3 and the minus-side input terminal of the comparator COMP4. The reference voltage value E3 is supplied to the minus-side input terminal of the comparator COMP5.

In the voltages across the terminals of the respective batteries Abat, Bbat in the battery protection circuit 1 that is placed in the above-mentioned connected state, the overcharged state or overdischarged state is detected by comparing the reference voltages E1, E2 (+1.5 V) and so-called detection voltage values generated through rudder resistor groups (R14, R15, R11, R17, R18, R19) by the comparators COMP1 to COMP4. More specifically, the comparators COMP1, COMP3 compare detection voltage values that result from dividing the voltages of the batteries Abat, Bbat with the positive reference voltages E1, E2 (+1.5 V) supplied to the plus-side input terminals thereof. The comparators COMP2, COMP4 compare detection voltage values that result from dividing the voltages of the batteries Abat, Bbat with the positive reference voltages E1, E2 (+1.5 V) supplied to the minus-side input terminals thereof. Incidentally, the reference voltage E1 (+1.5 V) holds the potential of the terminal VC at zero V by the level shift and supplies the same to the comparators COMP1, COMP2 as comparison reference voltages.

The rudder resistor groups formed of the resistors R14, R15, R11, R17, R18, R19 connected in series are provided so as to divide voltages so that these divided voltages can be compared with the reference voltages E1, E2 (+1.5 V) upon overcharge and upon overdischarge. Further, the comparator COMP5 is utilized to detect an overcurrent by comparing the reference voltage value E3 (+1.5 V) with the voltage at the minus-side terminal (Eb–1).

Operation carried out on the basis of the above-mentioned reference voltages will be described in accordance with the following items.

(a) Charging and overcharging:

In the case of the charging, a charging current is flowed to the minus-side terminal (Eb–) from the plus-side terminal (Eb+) serving as the connection terminal connected to the external battery charger or the discharge load terminal through the secondary batteries Abat, Bbat and the power NMOS transistors QD, QC.

When the charging proceeds and the overcharged state is presented, a H (high) level signal from the overcharge detecting circuit (comparators COMP2, COMP4) is input to the NOR gate G8. The output from the NOR gate G8 becomes an L (low) level signal. This L level signal is input to the GND level shift unit LSH2 of the charging logic, in which it is ground level shifted (which will be described later on). At that time, the input condition of the NAND gate G10 are not satisfied any more, and the power NMOS transistor QC is turned off.

The comparators COMP2, COMP4 have enough hysteresis width voltage (e.g., 0.2 V). When the hysteresis signal from the AND gate G1 is at H level, the hysteresis is released (see (e) Hysteresis signal which will be described later on), and operation for starting the recharging is avoided immediately.

Simultaneously, the H level signal from the output terminal of the comparator COMP2 turns on the NMOS transistor Q14, whereby an overcharging overflow current is discharged to protect the battery Abat serving as the battery. More specifically, when the NMOS transistor Q4 is turned on, a current is flowed to the resistor R11 through the terminal CPU connected to the plus-side of the battery Abat, and the battery Abat is discharged to the low voltage (e.g., 4.2 V) corresponding to the hysteresis width. The comparator COMP4 and the PMOS transistor Q15 or the like utilized in the battery Bbat similarly function and therefore need not be described.

That is to say, the hysteresis circuit is operated so as to avoid the immediate charging after the charging current was interrupted and the overcharged overflow current is discharged, thereby protecting the batteries (batteries Abat, Bbat).

(b) Overdischarging.:

The batteries (batteries Abat and Bbat) are set in the discharging state by connecting the load to the plus-side terminal (Eb+) and the minus-side terminal (Eb−). This discharging state is constantly monitored by the overdischarge detecting circuit mainly formed of the comparators COMP1, COMP3. Mainly the comparator COMP1 that detects the overdischarged state of the battery Abat will be described hereinafter. When the discharging state is continued and the voltage of the battery Abat, for example, becomes an overdischarged voltage (e.g., 2.4 V), such voltage is compared with the reference voltage E1 (+1.5 V), and the H level signal is output from the output terminal of the comparator COMP1.

The H level signal from the output terminal of the comparator COMP1 is input through the NOR gate G2 to the NOR gate G3 which derives the H level signal. The H level signal from the NOR gate G3 is input to the NOR gate G9 whose output signal goes to L level to turn off the power NMOS transistor QD, thereby interrupting the discharge current.

The H level signal from the NOR gate G3 is input to the NAND gate G4 and an L level signal is input to the NAND gate G6 of the power down latch circuit. The L level signal is set in the latched state by the NAND gates G5, G6. When this latched state is held, the power down signal (PDB) goes to the L level. Simultaneously, the power down signal (PDA) also is set in the L level by means of the PMOS transistor Q11.

The power down signal (PDB) that is set in the L level opens the power down switch PDSW2 to interrupt the reference voltage source 29, thereby turning off the reference voltage sources E1, E2, E3.

Further, the power down signal (PDA) that is set in the L level opens the powder down switches PDSW2, PDSW3, PDSW4 to interrupt the voltages supplied to the comparators COMP1 to COMP5 and voltages supplied to the rudder resistor groups (resistors R14, R15, R11, R17, R18, R19).

Upon power down, the circuit arrangement is switched such that the outputs of the comparators COMP2, COMP4 become L level signals, the outputs of the comparators COMP1, COMP3 become H level signals, the output of the comparator COMP5 becomes the L level signal and the output of the delay CR becomes the H level signal.

(c) In case the overcurrent is detected:

The overcurrent is detected by a circuit arrangement mainly formed of the comparator COMP5 and detected by comparing the overcurrent with the reference voltage value E3 (+0.4 V). To be more concrete, when a potential difference that results from a voltage drop caused by ON-resistance values (e.g., 100 mΩ in total) of the NMOS transistors QD and QC exceeds the reference voltage value E3 (+0.4 V), the signal developed at the output terminal of the comparator COMP5 goes to H level. The H level signal from the output terminal of the comparator COMP5 becomes an L level signal through the NOR gate G9 after a duration (e.g., about 1.8 msec) generated from the delay CR formed of the resistor R4 and the capacitor C2. This L level signal turns off the power NMOS transistor QD to interrupt the discharging current. Under this condition, or when the power NMOS transistor QD is turned off, a high voltage at the terminal (Eb+) becomes the voltage value at the terminal VM through loads connected between the plus-side terminal (Eb+) and the minus-side terminal (Eb−). Accordingly, the high voltage value generated at the terminal VM becomes a value substantially close to the voltage value generated at the plus-side terminal (Eb+) so that the overcharge detection signal at the output side of the comparator COMP5 can be held at the H level.

If the load connected between the plus-side terminal (Eb+) and the minus-side terminal (Eb−) is removed, then the voltage at the terminal VM can be lowered to about 0V via the NMOS transistor Q13 and the resistor R5. Therefore, the overcurrent detection signal at the output terminal of the comparator COMP5 becomes L level so that the protection circuit can be returned from the overcurrent state.

Furthermore, the delay CR formed of the resistor R4 and the capacitor C2 is given a time longer than a predetermined time (e.g., about 1.8 msec). This time is provided in order to prevent the power NMOS transistor QD from being turned off when a large current is momentarily flowed due to a capacitor load or the like.

(d) Power down inhibiting logic:

The power down inhibiting logic is formed of the NOR gate G3 and the NAND gate G4 and a circuit that can inhibit the protection circuit from being set in the power down mode when the overdischarge is generated by the momentary large current or the like. In the case of a current large enough that the overcurrent detection is started, it is frequently observed that a voltage is lowered to the overdischarge detection state by the inside resistance of the battery. There is then the large disadvantage that the battery protection circuit is set in the power down mode by the capacitor a load or short-circuited erroneously. Therefore, the comparator COMP5 is operated such that, when the H level signal is output from the output terminal thereof, such H level signal is immediately input to the NOR gate G3 to thereby inhibit the battery protection circuit from entering the power down mode.

When the balances of the batteries formed of the batteries Abat and Bbat are considerably different, or even when one battery is in the overcharged state (e.g., overflow discharging after having been charged) while the other battery is in the overdischarged state, the battery protection circuit is inhibited from entering the power down mode by the NAND gate G4. Accordingly, when the battery is set in the overflow discharge state, the power supply is turned off, thereby preventing the battery from being left in the overcharged state.

(e) Hysteresis releasing signal: (output signal of AND gate G1)

When the battery is discharged under the overcharged state (e.g., immediately after the battery was charged), the power NMOS transistor QC is in its OFF state so that the discharging current is flowed to the parasitic diode D2. Then, the voltage at the terminal VM is increased by the forward voltage (e.g., about 0.7 V) of the parasitic diode D2, whereby the overcurrent detecting circuit is actuated to inhibit the battery from being discharged.

Thus, when the signal at the output terminal of the comparator COMP5 in the overcurrent detecting circuit goes to H level, the H level signal is forcibly input to the hysteresis releasing circuit of the comparators COMP2, COMP4 to forcibly release the hysteresis. When the hysteresis is released, the overcharge detection is returned to the normal state and the power NMOS transistor QD is turned on, thereby making it possible to discharge the battery.

When any one of the batteries Abat and Bbat is in the overdischarged state, the AND gate G1 inhibits the hysteresis from being released. In the overdischarged state, the discharging current cannot be flowed. Therefore, when the hysteresis is released, the battery protection circuit is set in the power down mode. At that time, the overflow current of the overcharged battery Abat or Bbat is turned off. The reason that the hysteresis is inhibited from being released is to avoid the battery from being left in the overcharged state, thereby protecting the battery. It is a very rare case that one battery is overcharged while the other battery is overdischarged.

(f) Charging from the power down mode:

When the battery charger is connected between the plus-side terminal (Eb+) and the minus-side terminal (Eb−), a charging voltage is applied across the two terminals so that the charging voltage becomes higher than the battery voltage (voltage between the batteries Abat and Bbat). As a result, the voltage at the minus-side terminal (Eb−) becomes lower than the minus-side voltage (GND) of the battery Bbat. In the power down mode, the power NMOS transistor QD and the power NMOS transistor QC are both in their OFF states as described before.

Under this condition, the potential at the minus-side terminal (Eb−), i.e.., the potential GND at the terminal VM becomes lower than the minus-side voltage GND so that a positive voltage is applied between the gate and source terminals of the NMOS transistor Q12. Accordingly, the NMOS transistor Q12 can be turned on. When the NMOS transistor Q12 is turned on, the input to the NAND gate G5 goes to the L level signal so that the output of the NAND gate G5 becomes the H level signal regardless of the state of the other input. Accordingly, the power down releasing can be prepared (see (g) Return from the power down mode which will be described later on).

When the NMOS transistor Q12 is turned on, the PMOS transistor Q9 is turned on and the NMOS transistor Q10 is turned off through the OR gate G7 and the NAND gate G10. Then, the potential at the terminal OV becomes equal to the potential at the plus-side terminal (Eb+) through the terminal VDD to turn on the power NMOS transistor QC, thereby the charging being started to flow a charging current.

Simultaneously, because the input of the NOR gate G11 becomes the L level signal (the other input becomes the L level signal because the battery is in the overdischarged state), the output of the NOR gate G11 becomes the H level signal to cause the signal at the gate terminal of the NMOS transistor Q12 to go to H level. Accordingly, the activation states can be held by the NMOS transistor Q12 and the NOR gate G11.

When the power NMOS transistor QC is turned on, the voltage at the minus-side terminal (Eb−) is increased and becomes a voltage a little lower than that at the GND. This voltage is changed in situation depending on the holding voltages of the batteries Abat and Bbat. More specifically, when the holding voltages held of the batteries Abat and Bbat are 0V, then the voltage between the drain terminal and the source terminal of the power NMOS transistor QC does not become less that a cut-off voltage Vgsoff (e.g., 2 V) developed between the gate terminal and the source terminal of the power NMOS transistor QC.

Consequently, the gate voltage of the power NMOS transistor QC is 0V and the source voltage thereof, i.e., voltage at the terminal VM is minus voltage and the power NMOS transistor QC is turned on and hence a charging current is flowed thereto. At that time, the power NMOS transistor QD is in its OFF state so that the charging current is flowed through the parasitic diode D1 of the power NMOS transistor QD.

Further, because the GND level of the charging logic is at the potential of the terminal VM, a voltage corresponding to a voltage drop generated by the charging in the power NMOS transistors QD, QC becomes a voltage source that drives the charging logic.

When the charging is advanced a little and the holding voltage of the battery is increased, the gate voltage of the power NMOS transistor QC is increased and the minus voltage of the potential of the terminal VM is decreased. When the charging is further advanced and the circuit is escaped from the power down mode, the power NMOS transistor QD is turned on and the potential at the terminal VM becomes substantially 0V.

When both voltages of the batteries Abat and Bbat become higher than the overdischarging voltage, both signals at the output terminals of the comparators COMP1, COMP2 become L level signals. Further, the signal at the output terminal of the NOR gate G2 becomes the H level signal and the signal to the input terminal of the NAND gate G6 becomes the H level signal. On the other hand, because the signal to the input terminal of the NAND gate G5 is the L level signal, the output of the NAND gate G5 becomes the H level signal.

Then, the two input signals to the NAND gate G6 become the H level signals so that the latch in the power down circuit is inverted and the circuit is escaped from the power down mode.

Simultaneously, the output of the NOR gate G2 becomes the H level signal so that the input signal to the AND gate G11 becomes the H level signal. Regardless of the level of the other input signal to the NAND gate G11, the output from the NAND gate G11 becomes the L level signal. At that time, the holding of the activation state by the NMOS transistor Q12 and the NAND gate G11 is released.

Furthermore, the power NMOS transistor QD is turned on through the NOR gate G9 by the L level signal developed at the output terminal of the NOR gate G3 and the charging in the normal state is presented.

(g) Return from the power down mode:

The normal charging state can be returned from the power down mode when the power down signals PDA and PDB are changed from the L level to the H level. The condition that the power down signal PDA goes to H level is deeply associated with the voltage of the battery (batteries Abat, Bbat). That is to say, the power down signal PDA controls the rudder resistor groups and on and/or off of the comparators. The power down signal PDB controls the on and/or off of the reference voltage source 29. The power down signal PDB is immediately returned to the H level when the charging is started (NMOS transistor Q12 is turned on and the PMOS transistor Q11 is turned off), thereby closing the power down switch PDSW2 to turn on the reference voltage source 29. When the reference voltage values E1, E2 (+1.5 V) and E3 (0.4 V) are generated, the PMOS transistor Q11 is turned on by a predetermined reference voltage generation signal and the power down signal PDA goes to H-level, thereby closing the power down switches PDSW1, PDSW3, PDSW4.

(h) Charging logic:

When the charging is started, the signal of L level from the activation circuit (formed of the NOR gate G11 and the NMOS transistor Q12) is input to the OR gate G7 whose output signal goes to H level. This H level signal is input to one input terminal of the NAND gate G10. The NAND gate 10 is supplied at the other input terminal with the signal from the GND level shift unit LSH2. When the battery is not overcharged, there is obtained the H level signal so that the output of the NAND gate G10 becomes the L level signal. As a result, the PMOS transistor Q9 is turned on and the NMOS transistor Q10 is turned off. Then, the signal at the terminal OV becomes the H level signal and the power NMOS transistor QC is turned on, thereby flowing the charging current.

When the charging current is continued to present the overcharged state, the signal from the overcharge detecting circuit goes to H level. This H level signal is input to the NAND gate G10 by means of the ground level shift (will be described later on) and the H level signal is output at the output terminal of the NAND gate G10. Then, the signal at the terminal OV becomes the L level signal and the power NMOS transistor QC is turned off, thereby interrupting the charging current.

The ground level shift will be described with reference to FIGS. 4 and 5. In the ground level shift, a source potential of the power NMOS transistor QD that is a discharging side ground (potential of the ground terminal VSS of the battery) and a potential of the source terminal of the high power NMOS transistor QC that is a charging side ground (potential of the terminal VM) are shifted to become the same potential.

Figure 4:
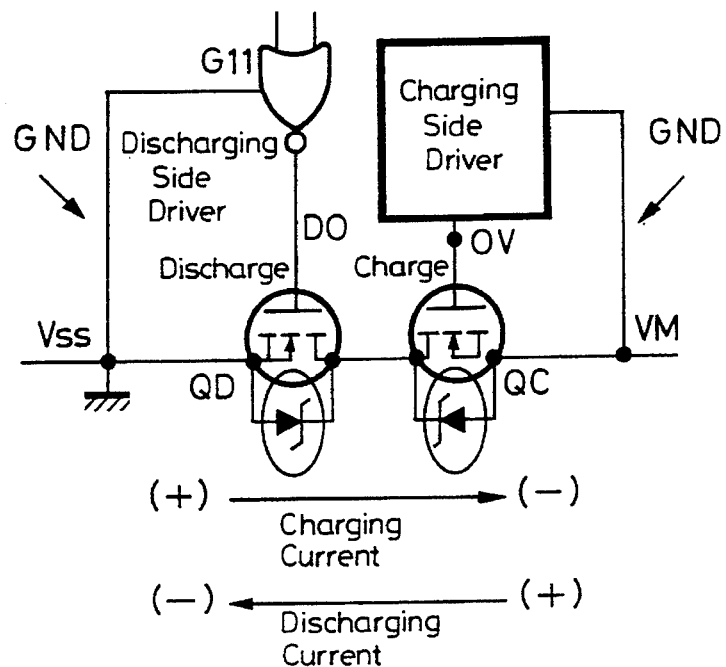
FIG. 4 is a diagram showing a ground condition (GND) of a power MOS transistor used in the present invention.

FIG. 4 shows a charging and discharging circuit mainly formed of the power NMOS transistor QD and the power NMOS transistor QC in the aforementioned circuit arrangement shown in FIGS. 3A and 3B. The charging power NMOS transistor QC and the discharging power NMOS transistor QD cannot be turned off completely unless the voltages thereof are set to 0 V relative to the potential of the terminal VM and the potential of the terminal VSS>

In order to remove such disadvantage, a resistor is provided in the charging logic to add a so-called ground level shift function to the charging logic. The ground level shift function will be described in detail with reference to FIG. 5. FIG. 5 shows an example of the ground level shift in which the MOS transistors in the charging logic shown in FIG. 3 are represented by QP, QN and the resistor R.

If the potential of the terminal VM is the same as that of the terminal VSS when the potential of the terminal VSS that is a point x is the L level signal, the MOS transistor QP is turned on and the MOS transistor QN is turned off so that an OUT signal goes to H level without causing any trouble. If the potential of the terminal VM is lowered (always lowered during the charging) without interposing the resistor R between the MOS transistors QP and QN, the MOS transistor QN also is turned on. Hence, the MOS transistors QP and QN are both turned on. That is, the short-circuited state is presented and hence the H level state of the OUT signal becomes the level of the indefinite state. Further, there is then the disadvantage that a short-circuit current is flowed between the MOS transistors QP and QN.

Figure 5:
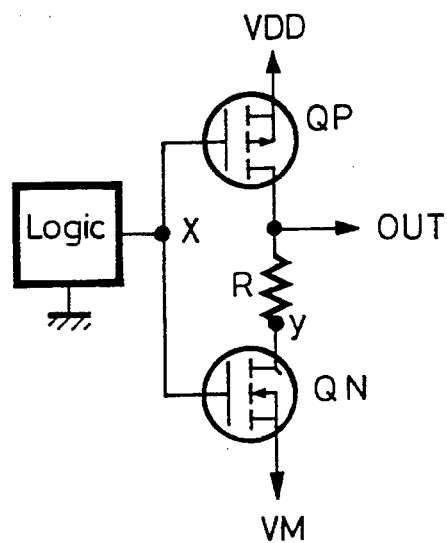
FIG. 5 is a block diagram showing an example of a so-called ground level shift in which a ground potential (GND) shown in FIG. 4 is shifted to the same potential.

To avoid such disadvantage, as shown in FIG. 5, the resistor R is interposed between the MOS transistors QP and QN. With this arrangement, even when the MOS transistor QN is turned on, a signal at a point y goes to L level and the H level state of the OUT signal is maintained. Since the short-circuit current is flowed to the resistor R, the resistance value of the resistor R must be selected in a range of from several kiloohms to several megaohms. Incidentally, the short-circuit current is flowed only when the battery is charged. Further, when the a signal at the point x is at H level, even if the potential at the terminal VM is decreased or increased, then the OUT signal goes to L level (i.e., potential at the terminal VM).

(i) Circuit in the power down mode:

In the power down mode, it is frequently observed that the power of the comparator is turned OFF and the output of the comparator becomes unstable. Accordingly, the outputs of the respective comparators are separated and set in the necessary signal states. That is to say, the signal of the overcharge detection signal is maintained at L level, the signal of the overdischarge detection output is maintained at H level and the signal of the overcurrent detection output is maintained at L level. These signals can be controlled by the power down signal in association with MOS transistors properly incorporated. Further, the NMOS transistor Q13 in the constant current circuit is a circuit that makes the voltage at the terminal VM zero V when a load is not applied.

Furthermore, the resistors R10, R11, R12, R13 and R22 connected to the terminals VDD, CPU, CPD, VSS and VM are protection resistors and a potential difference due to the resistors is not generated fundamentally.

As described above, the battery protection circuit of the present invention can achieve the following effects.

Because the battery protection circuit includes the state holding means for detecting by the occurrence of the charging voltage across the terminals of the secondary battery that the battery is changed to the re-charging starting state from the overdischarging state and holding the charging state, the battery protection circuit can be returned from the so-called power down mode to the charging state with ease.

The state holding means can reliably return the circuit from the power down mode by holding the charging state until the voltage of the secondary battery is escaped from the overcharge region.

When the power down mode is released, the circuit can be reliably returned from the power down mode by making the power down switching means conductive after the reference voltage is generated.

Because the battery protection circuit includes forcing means for forcing the secondary battery to become chargeable if the voltage of the secondary battery is substantially 0 V when the power down switching means is nonconductive, the circuit can be returned from the power down mode without a voltage that controls the switching means.

Because the battery protection circuit includes the power down inhibiting means for inhibiting the power down switching means nonconductive when any one of the secondary batteries is overcharged, a so-called overflow current of the secondary battery in the overcharged state can be flowed and the life of battery can be extended.

Since the battery protection circuit includes the preventing means for preventing the circuit from being set in the power down mode when a large current is flowed momentarily, the circuit can be prevented from being placed in the power down mode even when a large current momentarily generated by the load of the capacitor occurs or when the momentary short-circuit state occurs. Therefore, the battery voltage can be supplied stably regardless of temporarily external fluctuation.

Having described a preferred embodiment of the invention with reference to the accompanying drawings, it is to be understood that the present invention is not limited to that precise embodiment and that various changed and modifications could be effected by one skilled in the art without departing from the spirit or scope of the invention as defined in the appended claims.

What is claimed is:

1. A battery protection circuit comprising:

a) a secondary battery;

b) state detecting means for detecting a voltage of said secondary battery and detecting an overdischarged or overcharged state of said secondary battery by comparing said detected voltage with a reference voltage;

c) first switching means for interrupting a discharging current;
d) second switching means for interrupting a charging current;
e) control means for controlling the switching of said first and second switching means on the basis of a detected result of said state detecting means;
f) power down switching means for interrupting a supply voltage and the reference voltage supplied to said state detecting means;
g) power down means for making said power down switching means enter a nonconductive state when the overdischarged state of said secondary battery is detected by said state detecting means;
h) power down releasing means for returning said power down switching means from the nonconductive state to a conductive state when a charging of said secondary battery is started again from the overdischarged state; and
i) state holding means for detecting that said secondary battery is started to be charged again from the overdischarged state by detecting the occurrence of a charging voltage produced across terminals of said secondary battery and for holding the detected charging state.

2. The battery protection circuit according to claim 1, wherein said state holding means holds said charging state until a voltage of said secondary battery rises above an overdischarging region.

3. The battery protection circuit according to claim 1, wherein said secondary battery comprises a plurality of sub-batteries connected in series, and wherein said power down means makes said power down switching means enter said nonconductive state when an overdischarged state of at least one of said plurality of sub-batteries is detected by said state detecting means.

4. The battery protection circuit according to claim 3, wherein said power down releasing means makes a reference voltage power down switching means in said state detecting means enter a conductive state at first and makes a second power down switching means enter a conductive state after the occurrence of a reference voltage is detected.

5. The battery protection circuit according to claim 4, further comprising means for forcing said secondary battery to be charged when said power down switching means is in the nonconductive state and a voltage of said secondary battery is substantially 0V.

6. The battery protection circuit according to claim 3, further comprising power down inhibiting means for holding said power down switching means in the conductive state when any of said plurality of sub-batteries is in the overcharged state.

7. The battery protection circuit according to claim 6, further comprising overcurrent detecting means for detecting a large current flow through said plurality of sub-batteries when said large current flows momentarily, whereby said power down inhibiting means inhibits said power down switching means from being made to enter the nonconductive state on the basis of a detection signal from said overcurrent detecting means.

* * * * *